No. 760,421. PATENTED MAY 24, 1904.
J. E. CHAMBERS.
OPHTHALMOMETER.
APPLICATION FILED NOV. 30, 1903.
NO MODEL.

Witnesses:—
Ernest Pulsford.
M. J. Dixon

Inventor:—
John E. Chambers,
By his Attorney,
Henry H. Bates.

No. 760,421.

Patented May 24, 1904.

UNITED STATES PATENT OFFICE.

JOHN E. CHAMBERS, OF CHICAGO, ILLINOIS.

OPHTHALMOMETER.

SPECIFICATION forming part of Letters Patent No. 760,421, dated May 24, 1904.

Application filed November 30, 1903. Serial No. 183,227. (No model.)

*To all whom it may concern:*

Be it known that I, JOHN E. CHAMBERS, a citizen of the United States, residing at Chicago, in the county of Cook and State of Illinois, have invented new and useful Improvements in Ophthalmometers, of which the following is a specification.

My invention is an improvement in ophthalmometers, also called "keratometers," the object of which is to measure the variations of curvature in the cornea of the eye, which are the principal cause of the irregularities of refraction known as "astigmatism." This measurement is commonly effected by observing through a telescope the bright images of certain luminous objects called "mires," with means for shifting the relative positions of such images and means for indicating the degree of such displacements on a scale usually graduated in diopters of refractive power. The mires heretofore in use have been of two kinds: first, small white highly-reflective objects, movable or fixed, illuminated by a source of light in front and to the rear of the patient against a black background, and, second, translucent mires illuminated from the rear and attaining the requisite brightness by transmitted light.

My invention appertains to an improvement in this portion of the apparatus; and it consists in doing away with the mires altogether as tangible objects and gaining the desired result by means of perforations of suitable shape made in the blackened disk, through which perforations light from an adjustable white or highly-reflective surface in the rear of said disk is thrown upon the eye under inspection, thus producing bright images on the reflective surface of the cornea, which give all the effects and results obtained from luminous mires in a superior and simpler manner.

Figure 1:
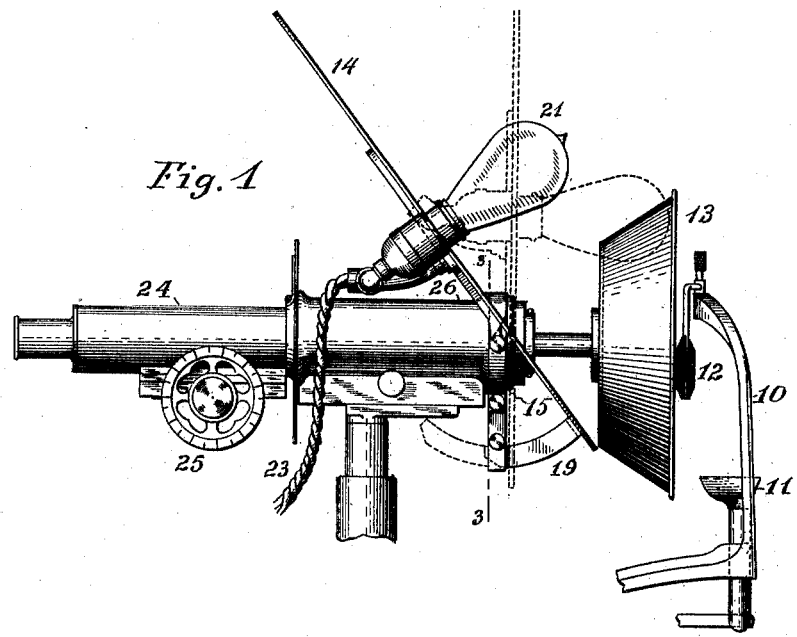
Figures 2, 3:
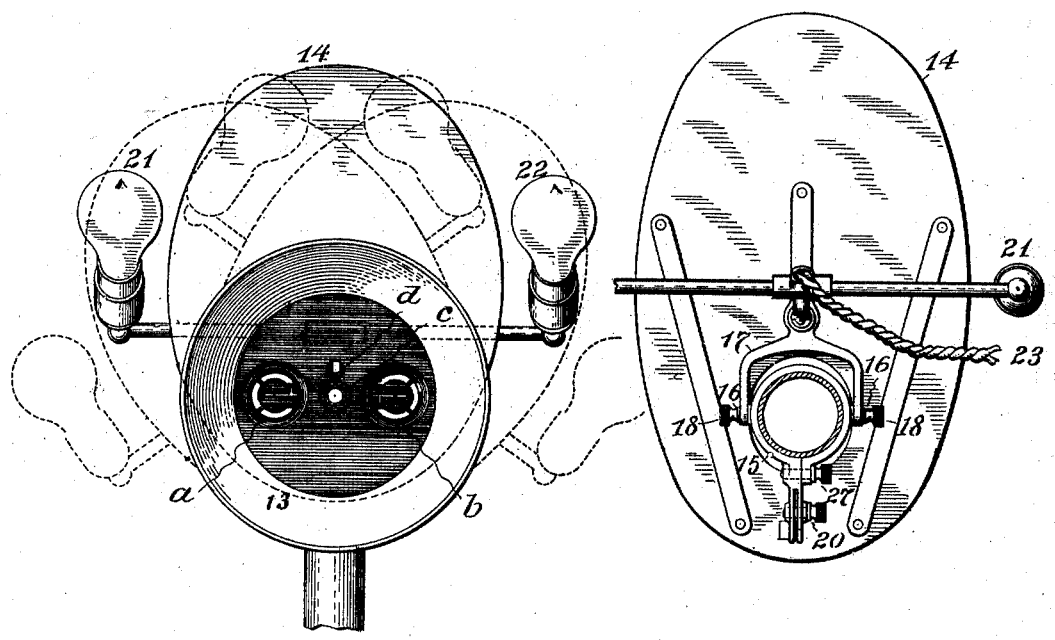

In the drawings forming a part of this specification, Figure 1 is a side elevation of the working parts of the apparatus, showing the face-hoop and chin-rest, the blackened disk of basin shape, the adjustable reflective plate with means for artificial illumination, and the observing-telescope. Fig. 2 is a front elevation from the patient's position, showing the interior of the blackened disk, the perforations in the form of mires, and the adjustable reflector at the rear. Fig. 3 is a rear elevation showing the reflective plate with means for its adjustment in any position and the telescope in section on line 3 3 of Fig. 1.

10 is the usual face-hoop.

11 is the adjustable chin-rest.

12 is a movable eye-screen for the eye not under observation. 13 is the disk, in this case preferably of basin shape blackened on its interior to absorb diffused light and render the images more distinct, said disk being provided with apertures $a\, b$ in the shape of the mires heretofore employed, preferably equidistant from the aperture $c$ of the telescope.

$d$ is a perforation to afford the operator a sighting means for adjusting the eye under observation in correct position.

14 is the reflective plate carried on a clamp-ring 15 on the sleeve of the telescope, so as to be adjustable to any required position around the horizontal axis of the telescope, and 16 represents trunnions by which the said plate is adjustably secured to said ring 15 by the aid of yoke 17 on an axis of motion at right angles to the former axis, by which means an adjustment in all desired planes is attained for catching the light at the most favorable angle for reflection through the apertures $a\, b$ in lines convergent toward the axial line of the telescope. The yoke 17 is adjustable on said trunnions, which are provided with milled heads 18, so that the reflective plate can be readily adjusted to any position desired.

19 is a sector-piece for steadying the plate 14 and enabling it to be clamped in a fixed position by the clamp-screw 20.

21 22 are means for illuminating the reflective plate by artificial light when desired. They may be incandescent bulbs, as shown, or any other available source of light.

23 is the conductive cord for furnishing electrical energy to the bulb-lamps.

27 is a milled head and clamp-screw for fixing the clamp-ring 15 in any position to which it may have been adjusted.

24 is the telescope for observing the luminous images.

25 is the milled head and scale for adjusting the interior mechanism by which the approximation and separation of the movable images are effected.

26 is the sleeve in which the telescope is mounted.

The mode of operation and use being in all respects similar to that of ophthalmometers heretofore in use need not be detailed. The only departure is in the proper adjustment of the reflective plane to send the light through the apertures in the most favorable direction.

I claim and desire to secure by Letters Patent—

1. In an ophthalmometer, in combination, a telescope, a disk mounted on said telescope, said disk having on each side of the telescopic axis open apertures of the shape of and performing the function of mires.

2. In an ophthalmometer, a telescope, a blackened disk axially mounted on the telescope, apertures in said disk on each side of the telescopic axis, and a reflective plate behind the disk for sending light through said apertures.

3. In an ophthalmometer, a telescope, a blackened disk axially mounted on the telescope, apertures in said disk on each side of the telescopic axis, and a reflective plate movably mounted behind the perforated disk, with means for adjusting said movable plate at any desired angle and for clamping the same in position.

4. In an ophthalmometer, a telescope, a blackened disk perforated with mire-shaped apertures, a reflective plate behind said disk, adjustable to any required angle of inclination, means for fixing said plate in the adjusted position, and means for illuminating said plate artificially.

5. In an ophthalmometer, a telescope, a basin-shaped disk, blackened on its interior, perforated at the bottom with mire-shaped apertures, a reflective plate behind said apertures, adjustable circularly and angularly with reference to the axial line of the telescope, and means for securing said adjustments.

In testimony whereof I have signed my name to this specification in the presence of two subscribing witnesses.

JOHN E. CHAMBERS.

Witnesses:
CHARLES C. INSKEEP,
GUY A. HENRY.